United States Patent
Kojika (10) Patent No.: US 7,140,474 B2
(45) Date of Patent: Nov. 28, 2006

(54) PARKING BRAKE LEVER ATTACHING STRUCTURE FOR A SADDLE-TYPE VEHICLE

(75) Inventor: Ken Kojika, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/958,696

(22) Filed: Oct. 5, 2004

(65) Prior Publication Data

US 2005/0139433 A1    Jun. 30, 2005

(30) Foreign Application Priority Data

Oct. 10, 2003  (JP)  ............... 2003-352960

(51) Int. Cl.
 *F16D 65/14* (2006.01)
 *F16C 1/12* (2006.01)
(52) U.S. Cl. .................... 188/2 D; 74/501.6
(58) Field of Classification Search .......... 188/2 D; 74/501.6, 500.5
See application file for complete search history.

(56) References Cited

U.S. PATENT DOCUMENTS 3,741,148 A * 6/1973 Hauser .............. 116/28.1
4,534,439 A * 8/1985 Shimazaki et al. ......... 180/215
4,697,663 A * 10/1987 Trautwein ................. 180/210
5,217,094 A * 6/1993 Walter et al. ............... 188/2 D
5,452,775 A * 9/1995 Bussinger .................. 188/2 F
5,924,328 A * 7/1999 Okajima et al. ............. 74/489
6,298,937 B1 * 10/2001 Beom ......................... 180/272
6,676,149 B1 * 1/2004 Kamemizu et al. ...... 280/281.1

FOREIGN PATENT DOCUMENTS

JP    2002154469 A    5/2002

* cited by examiner

*Primary Examiner*—Robert A. Siconolfi
(74) *Attorney, Agent, or Firm*—Carrier, Blackman & Associates, P.C.; William D. Blackman; Joseph P. Carrier (57) ABSTRACT

A parking brake attachment structure is provided secured to a separate portion of the vehicle frame disposed above the main frame section. The attachment structure includes a bracket secured above the vehicle to the auxiliary frame. A stay is mounted so as to protrude rightwardly from the bracket. A lever support bracket is mounted to the stay, inclined at an angle from the vertical. A parking brake lever mechanism including a lever pin, a parking brake lever, and a spring, is provided in the lever support bracket such that the parking brake lever is inclined at angle from the vertical. The parking brake lever is offset from a vehicle centerline. This mounting configuration requires only a small space around a parking brake lever, and enhances operability and the operating feel of the parking brake.

18 Claims, 11 Drawing Sheets

PRIOR ART

PARKING BRAKE LEVER ATTACHING STRUCTURE FOR A SADDLE-TYPE VEHICLE

CROSS-REFERENCE TO RELATED APPLICATIONS

The present invention claims priority under 35 USC 119 based on Japanese patent application No. 2003-352960, filed Oct. 10, 2003.

BACKGROUND OF THE INVENTION

1. Field of the Invention

The present invention relates to a saddle-type vehicle provided with a parking brake lever connected to a parking brake mechanism, for temporarily fixing the position of a wheel when parking the vehicle. More specifically, the present invention relations to an improved attachment structure for mounting a parking brake lever on a frame of a saddle-type vehicle.

2. Description of the Background Art

A parking brake system for a saddle-type vehicle is conventionally known, in which a head pipe for supporting a handlebar is covered with a front cover, and in which a parking brake lever and a grip handle are disposed beneath the front cover. An example of a prior art parking brake system is disclosed in Japanese Patent Laid-open No. 2002-154469. The prior art system of this reference will be described with reference to FIG. 11, which is a reproduction of FIG. 5 of Japanese Patent Laid-open No. 2002-154469, and which has been renumbered herein.

Figure 11:
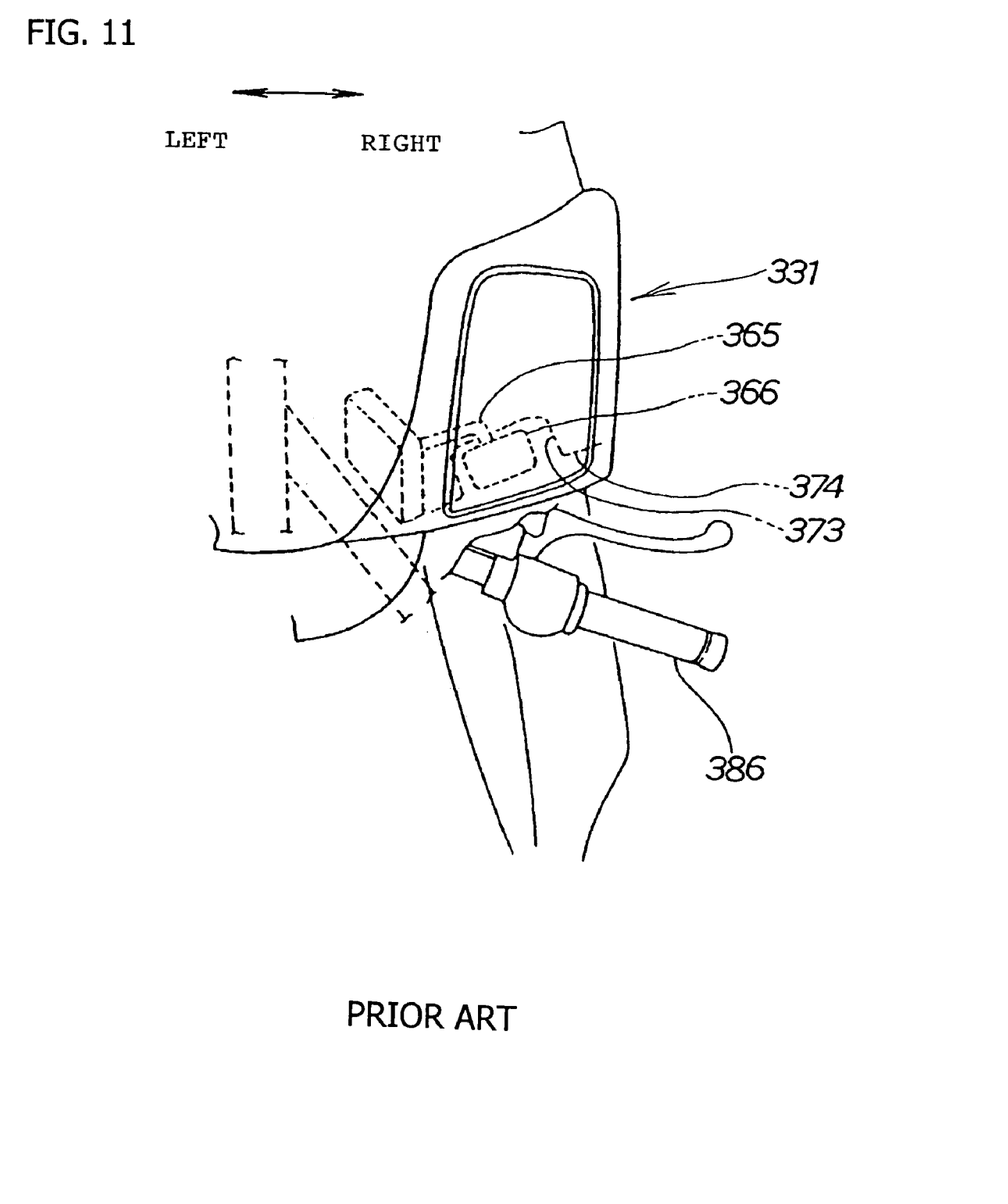
FIG. 11 is a perspective detail view of a PRIOR ART parking brake system as originally disclosed in FIG. 5 of Japanese Patent Laid-open No. 2002-154469.

FIG. 11 illustrates the basic construction of a prior art parking brake system. A parking brake lever 365 and a grip handle 366 are housed in a recessed portion 373 formed in a front cover 331. The parking brake lever 365 and the grip handle 366 are disposed so as not to protrude from a surface 374 of the front cover 331. Since the parking brake lever 365 and the grip handle 366 are disposed on the same, right-hand, side as a throttle grip 386, a operator can easily reach his or her right hand to operate the parking brake lever 365.

The prior art parking brake lever 365 is offset from the center of the vehicle, with an axis thereof extending generally vertically. An operating mechanism for the parking brake lever extends in the vehicle width direction. This necessitates providing a space for accommodating the operating mechanism in the vehicle width direction. In the prior art system, however, there is a shortage of space for mounting the operating mechanism, especially in the case of a vehicle that has no front cover 331. Specifically, positioning the parking brake lever 365 with the operating mechanism arranged in the vehicle width direction requires more space around the head pipe than would optimally be required.

SUMMARY OF THE INVENTION

The present invention provides an improved arrangement of components in a parking brake lever on a saddle-type vehicle. One object of the present invention is to provide an attachment structure, for a vehicle parking brake lever, that requires a small space around the parking brake lever. It is another object of the present invention to provide an attachment structure, for a vehicle parking brake lever, which enhances operability and operating feel of the parking brake. The invention is usable on a type of vehicle having no cowling at the front or rear, or on the right or left, of a front fork.

A first aspect of the invention is characterized in that, in a vehicle provided with a parking brake lever for temporarily fixing the position of a wheel while parking the vehicle, the parking brake lever is disposed in a position offset from the centerline of the vehicle. The parking brake lever is oriented to allow motion thereof in the fore-aft direction when operated. The parking brake lever has a central axis which is inclined at an angle relative to a vertical line that is substantially perpendicular to a flat, level ground surface.

In the practice of the present invention,-the parking brake lever may be situated proximate a head pipe of the vehicle frame. In a first embodiment of the invention, the head pipe is covered with a front cover, a lever box is provided on a side surface of the front cover, and an upper portion of the parking brake lever protrudes outwardly from the top of the lever box. When viewed from above, the lever box is narrower than a vehicle seat on which the operator sits. The letter box is also tapered inwardly from top to bottom, so that the bottom of the lever box is narrower than the top thereof.

The first embodiment of the present invention is further characterized in that a lateral outer side surface of the lever box is substantially parallel to the axis of the parking brake lever, and the axis of the parking brake lever is oriented to be directed toward a master cylinder.

In accordance with the features of the selected embodiment hereof, the parking brake lever may be offset from the centerline of the vehicle, and is oriented to allow motion in the fore-aft direction when operated. In addition, the axis of the parking brake lever is inclined relative to a vertical line that is substantially perpendicular to a flat, level ground surface. This configuration significantly enhances operating feel of the parking brake.

In further accordance with the features of the selected embodiment hereof, the parking brake lever is situated proximate the head pipe. This means that the parking brake lever is located near the handlebar. Therefore, during use of the parking brake, the operator only needs to move his or her hand a short distance from the handlebar to the parking brake lever. Placement of the parking brake lever near the head pipe significantly enhances operability of the parking brake lever.

In further accordance with the features of the selected embodiment hereof, the head pipe may be covered with the front cover, the lever box may be operatively attached to a side surface of the front cover, and the upper portion of the parking brake lever protrudes outwardly from this lever box. The inventive structure allows the operator to quickly and conveniently grasp the parking brake lever.

In further accordance with the features of the selected embodiment hereof, the lever box may be formed to narrower than the seat on which the operator sits, when viewed from above. Preferably, the lever box is made narrower than half of the width of the seat on which the operator sits, when viewed from above. The lever box is also formed so as to be narrower on its lower side that its upward side when viewed from the front. The invention thus minimizes the width of the required space for the lever box, and provides a compact lever box design.

In further accordance with the features of the selected embodiment hereof, the lateral, outer side surface of the lever box may be oriented substantially in parallel with the axis of the parking brake lever. The invention thus further minimizes the required space of the lever box, resulting in an even more compact design.

In further accordance with the selected embodiment hereof, the axis of the parking brake lever may be oriented to be directed toward the master cylinder. Accordingly, it is possible to set the parking brake lever at a suitable angle in such a manner that after the operator releases the handlebar, the operator can smoothly and easily grasp the parking brake lever.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 10(*a*) and 10(*b*) are explanatory top plan views showing operations of the parking brake lever. In FIG. 10(*a*), the parking brake lever is positioned toward the front of the vehicle and the brake is not activated. In FIG. 10(*b*), the parking brake lever is positioned toward the rear of the vehicle and the brake is activated.

DETAILED DESCRIPTION OF THE INVENTION

A selected illustrative embodiment of the present invention will now be described with reference to the accompanying drawings. The selected embodiment of the present invention will be described using a scooter-type vehicle as an example of a low-floor vehicle. The low-floor vehicle may be a two-wheeled, three-wheeled, or four-wheeled vehicle. The present invention is applicable to any type of vehicle, as long as the vehicle is constructed so as to meet the following requirements. Specifically, a front wheel and a rear wheel are provided at the front and in the rear of a vehicle body frame, respectively. The vehicle body frame includes a main frame section that extends rearwardly from the head pipe, and is V-shaped or U-shaped as viewed from the side. The main frame section is built so that the operator can easily sit astride it.

Figure 1:
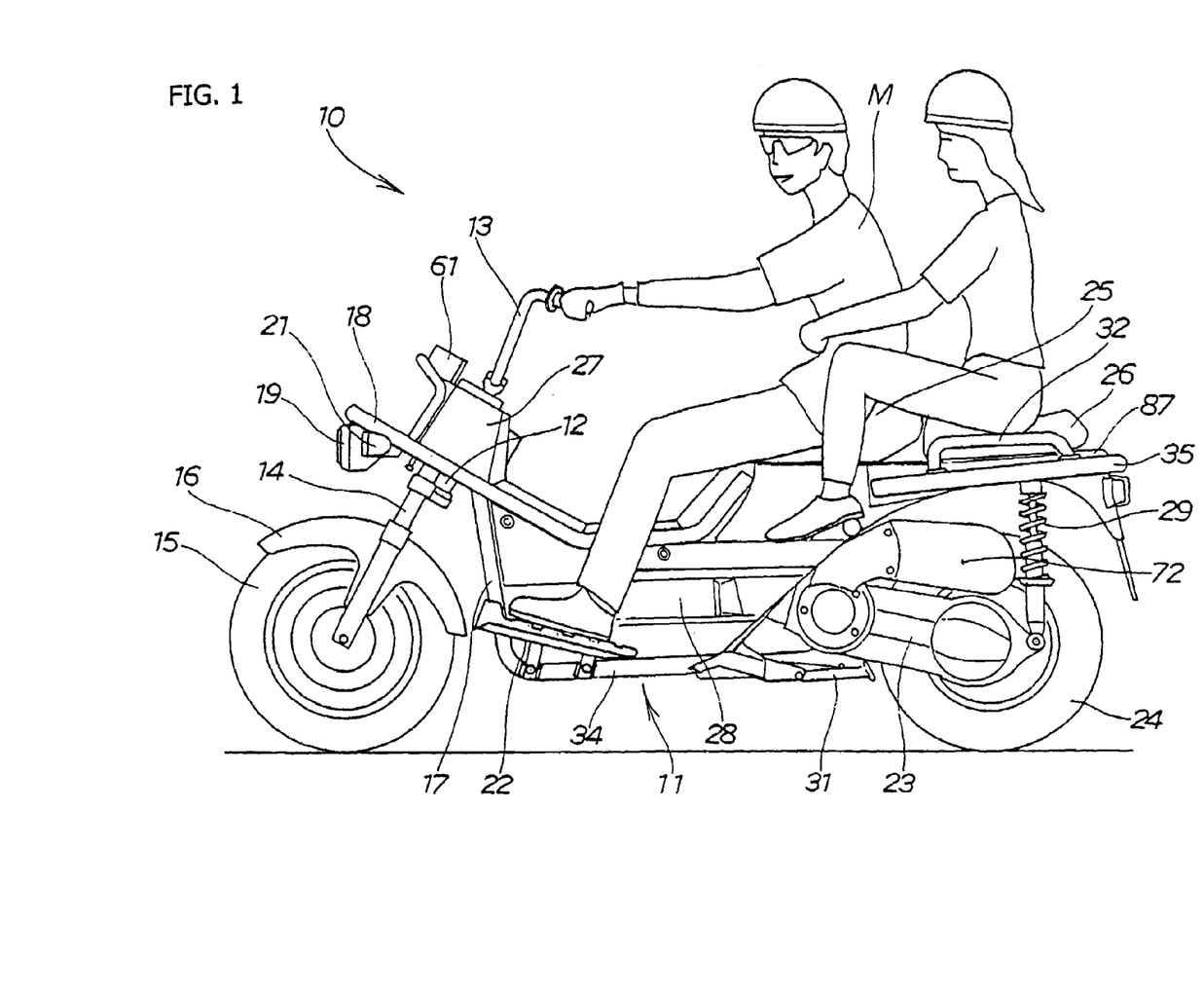
FIG. 1 is a side elevational view showing a two-seater version of a scooter-type vehicle incorporating a parking brake lever attachment structure according to a selected illustrative embodiment of the present invention.

FIG. 1 is a side elevational view showing a first example of a scooter-type vehicle according to a selected embodiment of the present invention, configured to seat two riders thereon. A scooter-type vehicle 10 is generally constructed as follows. Specifically, a handlebar 13 is steerably mounted on a head pipe 12, provided at the front of a vehicle body frame 11. A front wheel 15 and a front fender 16 are mounted to a front fork 14, which is connected to the handlebar 13.

An auxiliary frame 18 is mounted to the vehicle body frame 11. A headlamp 19, a turn signal lamp 21, and the like are attached to the auxiliary frame 18. A footrest 22 is fitted to a down tube 17. A powertrain unit 23 is mounted on the rear of the vehicle body frame 11, so as to be vertically swingable. A rear wheel 24 is mounted at a rear portion of the powertrain unit 23. A operator's seat 25 is provided obliquely upwardly and forwardly of the rear wheel 24, and a passenger seat combined with a seat back 26 is provided upward of the rear wheel 24. The scooter-type vehicle 10, being constructed as described above, is a two-seater light vehicle.

A characteristic feature of the appearance of the scooter-type low-floor vehicle is found in the area around its front portion, at which no cowling for covering the area surrounding the front fork 14 is provided, including the front, rear, or sides thereof. This enhances a nimble look of the front of the vehicle. In addition, the vehicle experiences less wind resistance without the cowling, and the operator can get a good steering feel. On the other hand, it is rather difficult to properly mount the lever on the vehicle or obtain a space for personal effects or the like without a cowling.

Referring again to FIG. 1, the vehicle 10 includes a handlebar post cover 27, a side cover 28, a rear shock absorber 29, a stand 31, and a grab rail 32.

Figure 2:
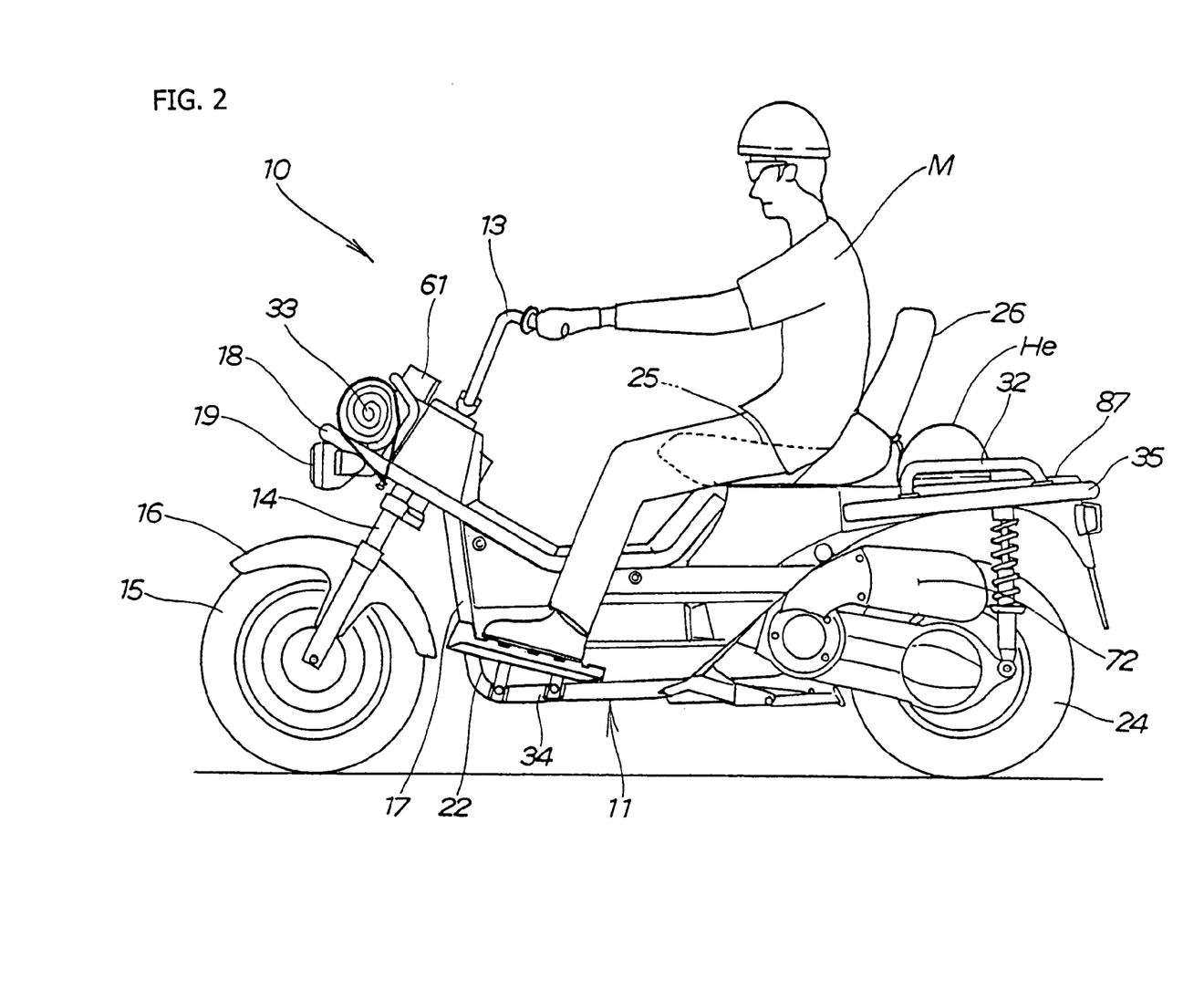
FIG. 2 is a side elevational view showing a one-seater version of a scooter-type vehicle incorporating a parking brake lever attachment structure according to a selected illustrative embodiment of the present invention.

FIG. 2 is a side elevational view showing a one-seater version of the scooter-type vehicle according to the selected embodiment of the present invention. The one-seater version shares the same basic construction with the two-seater version, as shown in FIG. 1. The same reference numerals are borrowed from the two-seater version to omit explanations. FIG. 2 shows the passenger seat, combined with a seat back 26, raised into an upright position to serve as a seat back for a operator M. FIG. 2 also shows that baggage 33, such as a tent, is loaded at the front portion of the auxiliary frame 18.

In the one-seater version, the handlebar 13 and the grab rail 32, as well as the auxiliary frame 18, the down tube 17, a lower pipe 34 extending from the down tube 17, and a rear frame section 35 are not covered by a cowling, and thus are exposed. In the conventional scooter-type vehicle, it is common practice to cover the vehicle body frame with a vehicle body cover, to ensure that most of the vehicle body frame is not exposed. According to the illustrative embodiment of the present invention, on the other hand, a good part of the vehicle body frame is exposed, to provide a new and different appearance from currently marketed vehicles of this type.

Figure 3:
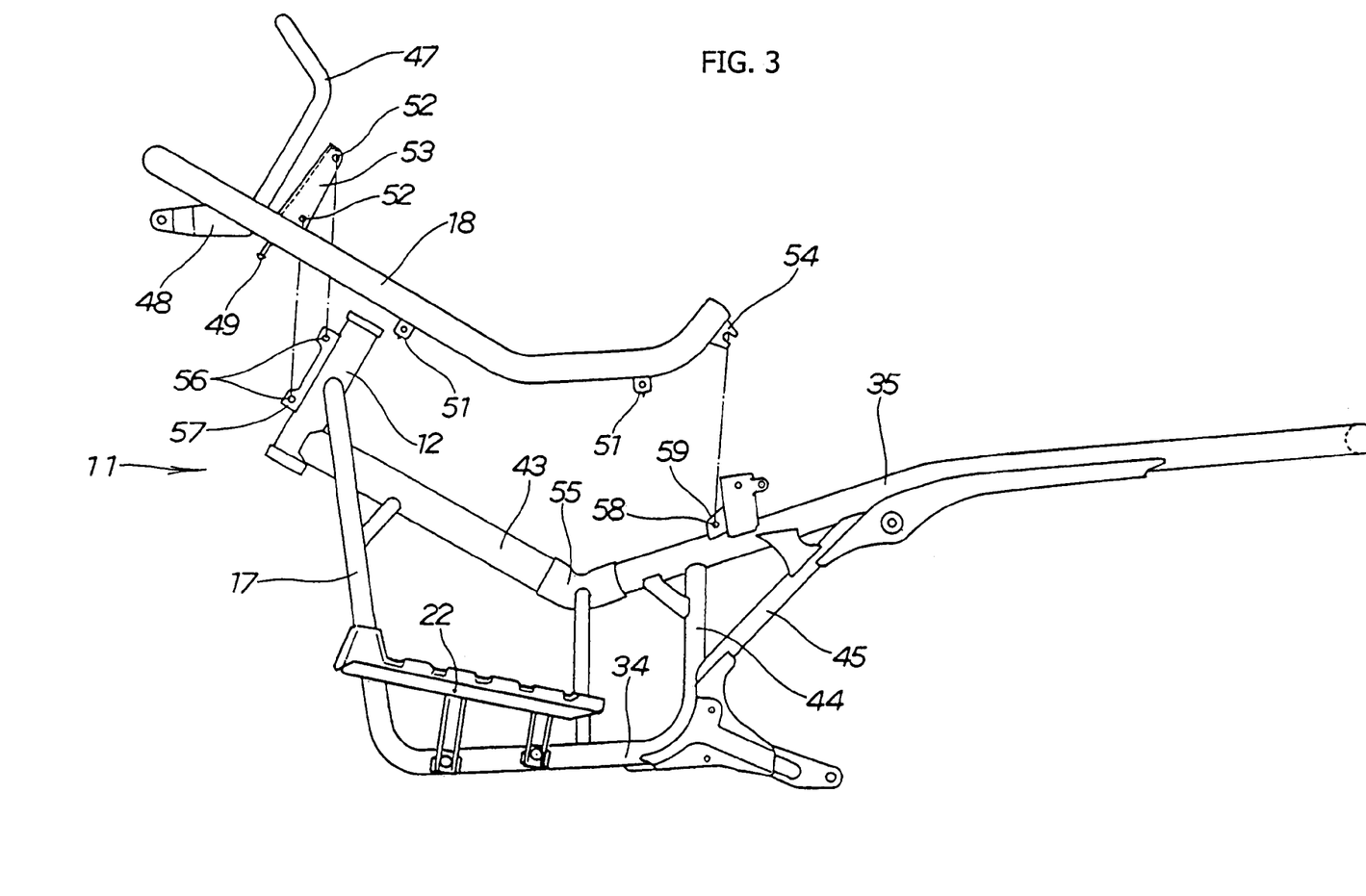
FIG. 3 is an isolated side view of the vehicle body frame of the scooter-type vehicles of FIGS. 1 and 2, showing an auxiliary frame located above the main frame section, and a rear frame section extending rearwardly from the main frame section.

FIG. 3 is an isolated view showing the vehicle body frame 11 of the scooter-type vehicle according to the illustrative embodiment of the present invention. The vehicle body frame 11 includes the following parts: specifically, a main frame section 43 extending from the head pipe 12 and being V-shaped or U-shaped as viewed from a side; the rear frame section 35 forming a rear portion of the main frame section 43 for extending the main frame section 43 rearwardly; the down tube 17 drooping downwardly from the head pipe 12; the lower pipe 34 extending substantially horizontally rearwardly from the down tube 17; a center frame section 44 rising upwardly from a rear end of the lower pipe 34; and a reinforcing stay 45 connecting the center frame section 44 with the rear frame section 35.

Referring to FIG. 3, the auxiliary frame 18 is provided having a simple shape and separated upwardly with respect to the main frame section 43. The auxiliary frame 18 will be described in detail below. The vehicle body frame 11 will then be described in detail with respect to an embodiment of the present invention of FIG. 5.

Figure 4:
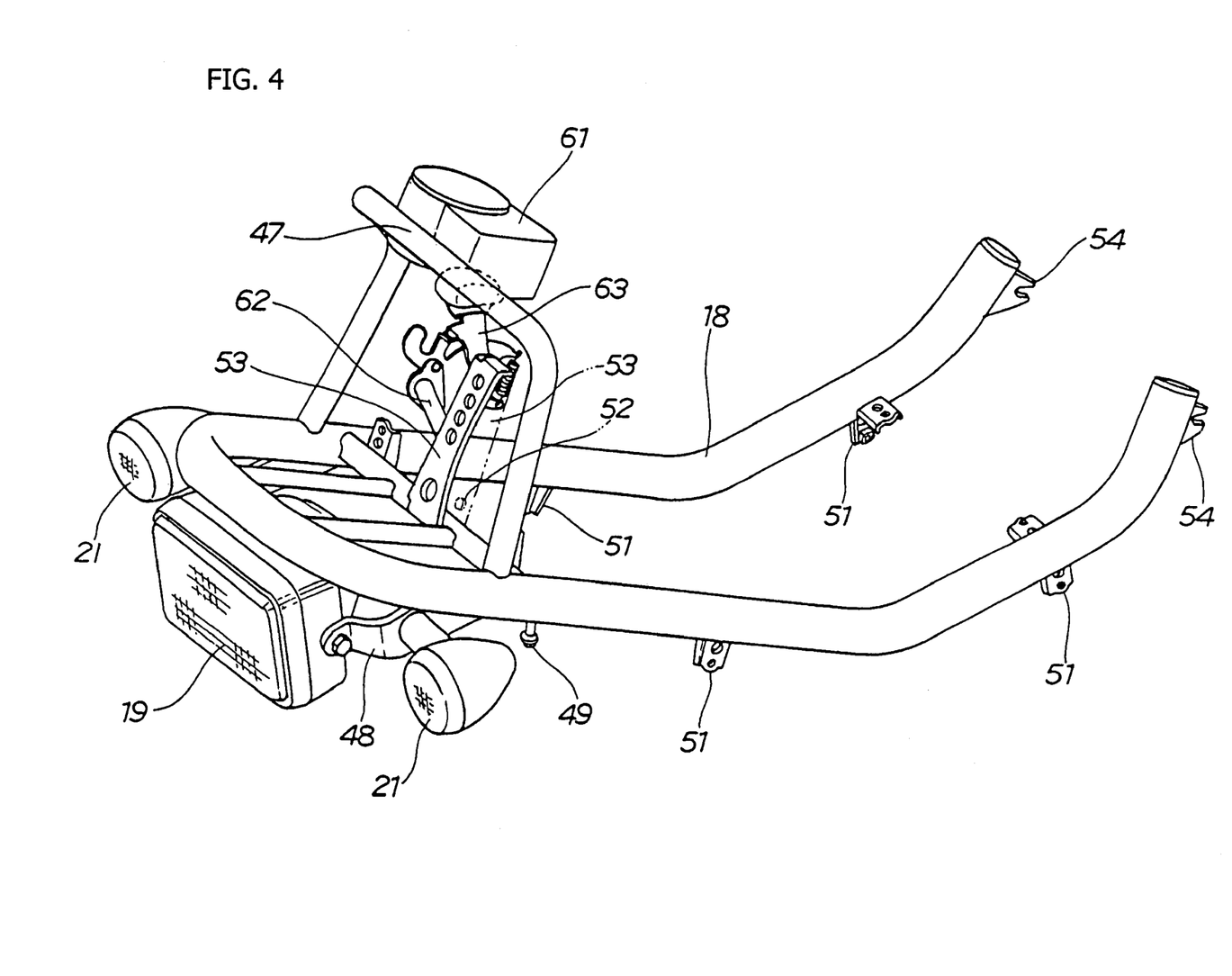
FIG. 4 is an isolated front perspective view of the auxiliary frame showing the plurality of parts mounted thereon.

FIG. 4 is an explanatory perspective view for explaining the function of the auxiliary frame 18 according to the illustrative embodiment of the present invention. The auxiliary frame 18 is a U-shaped pipe frame when viewed from above, and serves useful purposes as detailed in the following. Specifically, the turn signal lamps 21 and the headlamp 19 are mounted on a lamp support bracket 48, and the lamp support bracket 48 is secured to the underside of the auxiliary frame 18. A meter unit 61 is mounted on a baggage receiving pipe 47, which is secured to an upper side of auxiliary frame 18. A parking brake lever 63 is mounted to the right side of an upstanding bracket 53 via a stay 62, which is secured between parallel inner surfaces of auxiliary frame 18.

It is possible to shorten the time required for assembling vehicle parts in an assembly line by taking the following approach. Specifically, the vehicle parts including, for example, the turn signal lamps 21, the headlamp 19, the meter unit 61, the parking brake lever 63, and the like, are pre-assembled to the auxiliary frame 18 to form a subassembly. Then the subassembly, exactly as shown in FIG. 4, is assembled to the head pipe 12 and the main frame section 43. The baggage receiving pipe 47 is provided on the top surface at the front portion of the auxiliary frame 18. The lamp support bracket 48 and a baggage fixing hook 49 are provided on the bottom at the front of auxiliary frame 18, and cover fixing plates 51, 51 are provided on the bottom surface thereof. The auxiliary frame 18 further includes an upstanding bracket 53, which has a hole 52 formed on the top surface at the front portion thereof. The auxiliary frame 18 further includes U-shaped brackets 54 on the bottom surface in the rear portion thereof.

Referring again to FIG. 3, a front mounting plate 57 having holes 56, 56 therein is provided on the front surface of the head pipe 12. A rear mounting plate 59 having a hole 58 therein is provided on the top surface at the front portion of the rear frame section 35. The rear mounting plate 59 is situated proximate a Y-shaped connector fitting extending between the main frame section 43 and the rear frame section 35. The Y-shaped connector fitting is a portion at which one main frame section 43 meets two rear frame sections 35. The Y-shaped connector fitting is highly rigid. If the rear mounting plate 59 is provided at a position near this highly rigid Y-shaped connector fitting, it is advantageous in terms of strength in supporting the auxiliary frame 18. In the illustrated embodiment of the present invention, the rear mounting plate 59 is provided near the rigid Y-shaped connector fitting and rearwardly thereof.

The auxiliary frame 18 is rigidly integrated with the head pipe 12 and the main frame section 43, since the upstanding bracket 53 is bolted to the front mounting plate 57, and the U-shaped bracket 54 is bolted to the rear mounting plate 59.

Figure 5:
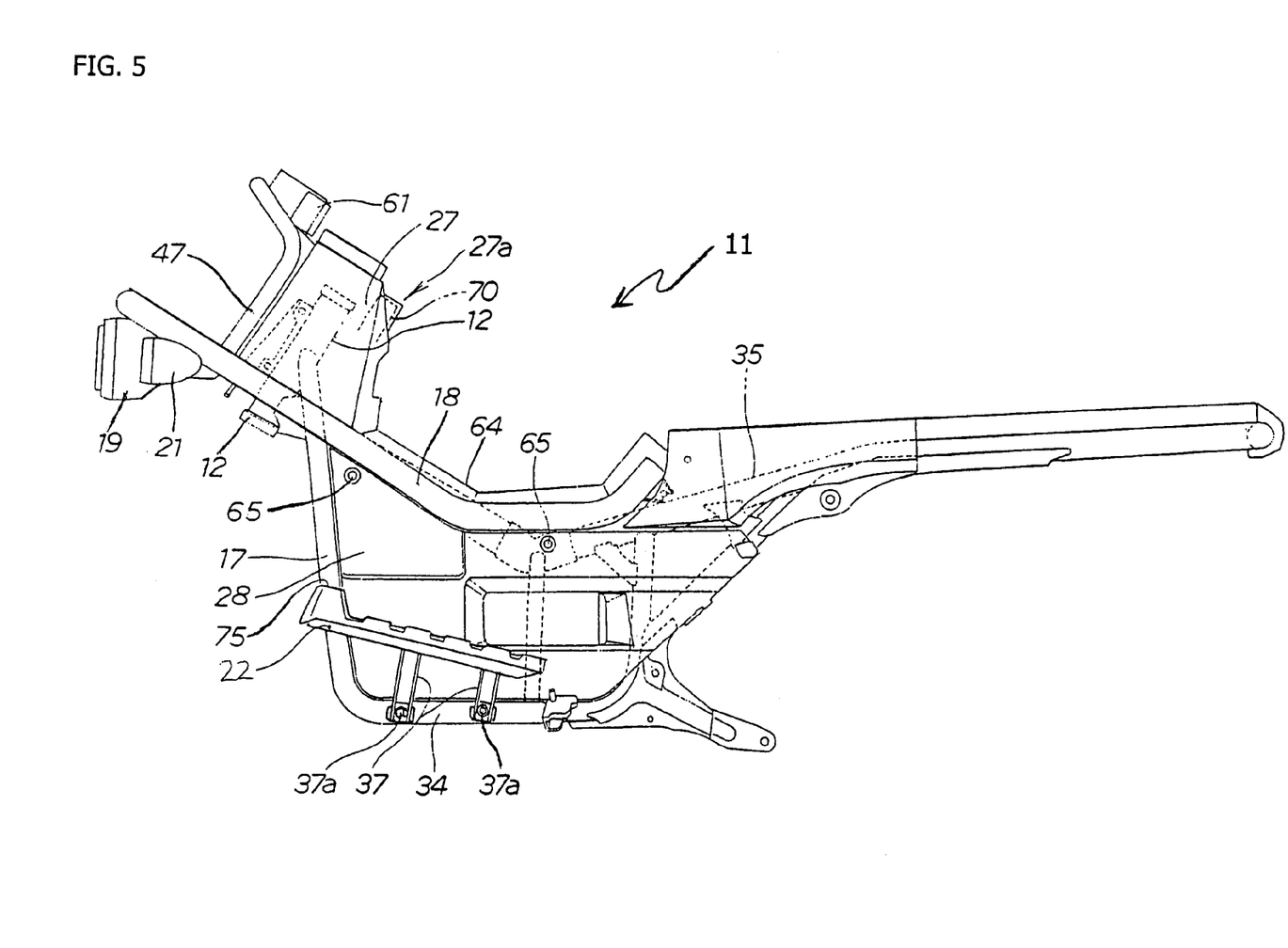
FIG. 5 is a side elevational view showing the vehicle body frame of the scooter-type vehicle according to the illustrative embodiment of the present invention, showing the handlebar post cover and the center cover portion mounted to the frame using bolts.

FIG. 5 is a side elevational view showing the vehicle body frame 11 of the scooter-type vehicle according to the illustrative embodiment of the present invention. Several parts are shown mounted to the vehicle body frame 11. Specifically, the auxiliary frame 18 is mounted to the head pipe 12 and the rear frame section 35. A center cover portion 64, integrally including the handlebar post cover 27, is placed over the auxiliary frame 18. The side cover 28 is attached between the auxiliary frame 18 and the lower pipe 34, using bolts 65. A footrest 22 is mounted to the lower pipe 34.

As shown in FIG. 5, the front surface of the handlebar post cover 27 is formed with a flat surface to provide an ample baggage-receiving space at the front thereof. A shelf portion 27a is formed at an upper rear portion of the handlebar post cover 27. The shelf portion 27a forms a single step downward from upper side of the handlebar post cover 27. An ignition switch-handlebar interlocked security system 70 is attached to an inner surface of the shelf portion 27a.

Figure 6:
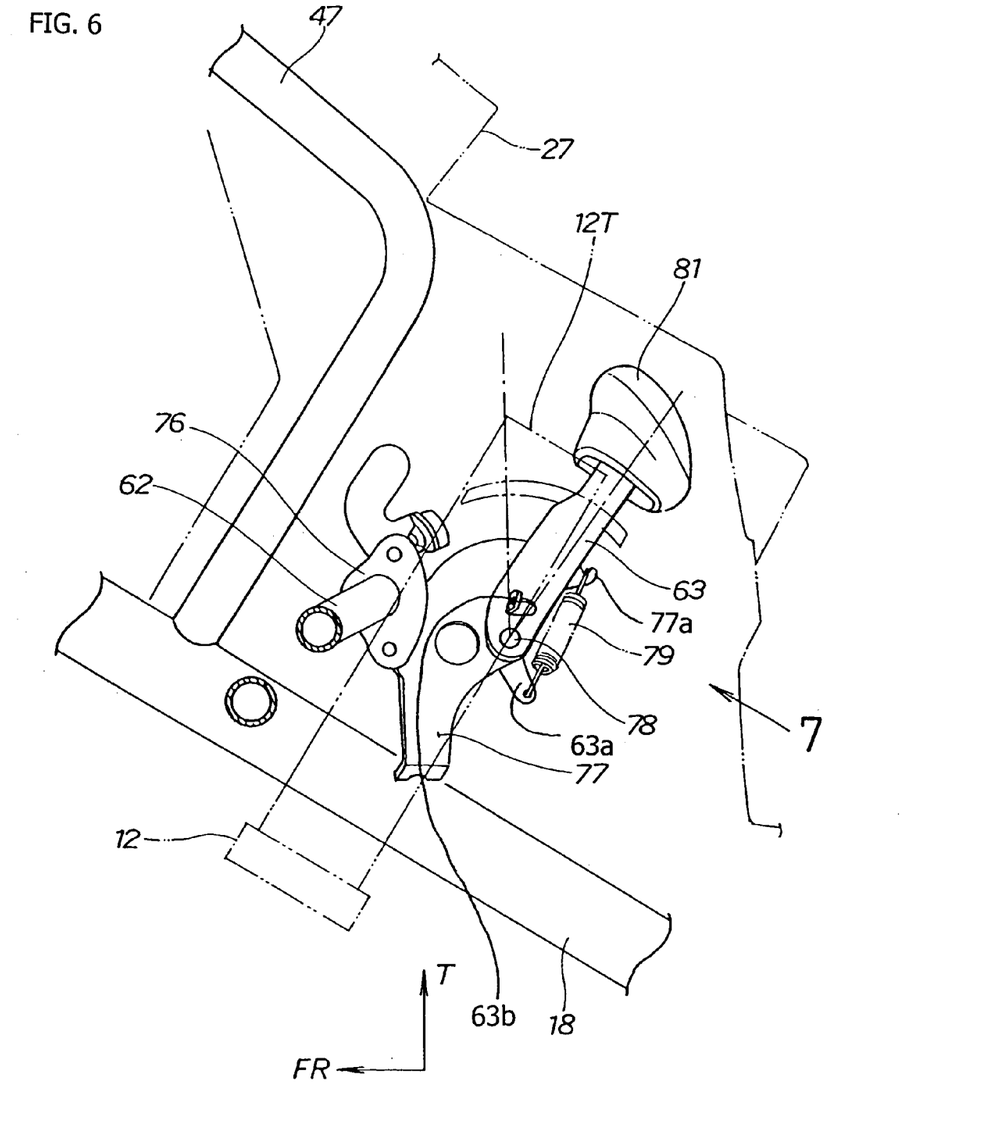
FIG. 6 is a side elevational view showing a parking brake lever mounting portion according to the illustrative embodiment of the present invention.

FIG. 6 is a side elevational view showing a parking brake lever mounting portion according to the illustrative embodiment of the present invention. The direction of arrow FR in FIG. 6 indicates the forward direction of the vehicle, and that of arrow T indicates the upward (top) direction of the vehicle. To allow an easier understanding of the position at which the parking brake lever 63 is provided, the upstanding bracket 53 (see FIG. 4) and the like are omitted from FIG. 6.

The parking brake lever 63 is mounted as detailed in the following. Specifically, the stay 62 is mounted to extend from the upstanding bracket 53 (not shown in FIG. 6, see FIG. 4) which is secured to part of the auxiliary frame 18. A flange portion 76 is provided at a leading end portion of the stay 62. A lever support bracket 77 is attached to the flange portion 76, using a bolt or other suitable fastener (not shown). The parking brake lever 63 is mounted on the lever support bracket 77 by way of a lever pin 78. The lever pin 78 forms an axis of rotation for the parking brake lever 63. A coil spring 79 is hooked between a lever side mounting portion 63a and a retaining finger formed at an end portion 77a of the lever support bracket. The spring 79 produces a self-returning force for returning the parking brake lever 63 to a forward position, subsequent to the parking brake lever 63 being pulled rearwardly during a parked state.

A reference numeral 63b represents a parking brake cable fixing portion provided for the parking brake lever 63. A cable (not shown) extends between the cable fixing portion 63b on parking brake lever 63 and the parking brake mechanism on the rear wheel. The parking brake mechanism, when activated through the cable using the parking brake lever 63, operates on the rear wheel to temporarily and disengagably lock the rear wheel and prevent it from rotating. The parking brake lever 63 is configured and oriented in such a manner that it can be reciprocally moved about the lever pin 78 in the fore-aft direction of the vehicle. Namely, the parking brake lever 63 can be moved in the fore-aft direction by operating a grip handle 81.

Figure 7:
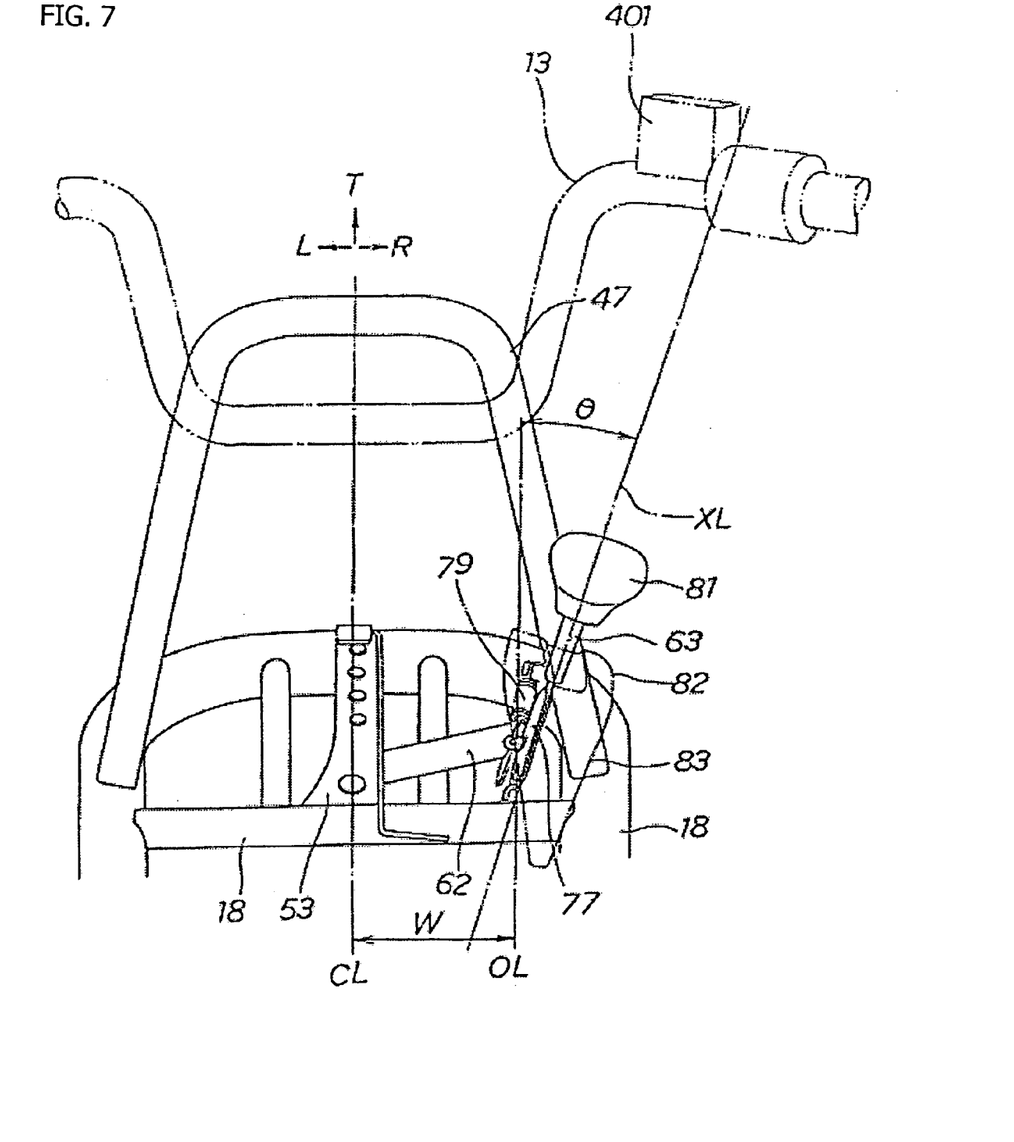
FIG. 7 is a plan view of the parking brake lever mounting portion, taken in the direction of the arrow 7 of FIG. 6, showing the parking brake mounted to be offset from a bracket by an amount W, and mounted to be oriented at an angle to the vertical.

FIG. 7 is a view as seen in the direction of arrow 7 of FIG. 6. In this figure, it can be seen that the upstanding bracket 53 is mounted extending substantially vertically upwardly above the main U-shaped pipe of the auxiliary frame 18. The stay 62 extends from upstanding bracket 53 so as to protrude laterally towards the right side of the vehicle. The lever support bracket 77 is mounted to a leading end portion of the stay 62 inclined from a vertical line at an angle of θ. A parking brake lever mechanism including the parking brake lever 63, the spring 79, and the like, is provided in the lever support bracket 77, and thus are also inclined from the vertical at an angle of θ.

Parking brake lever 63 is arranged to be disposed at an offset position OL that is offset by a distance W from a vehicle centerline CL. Further, an axis XL of the parking brake lever 63 is inclined at an angle of θ relative to a vertical line OL which is perpendicular to the ground surface when the vehicle is standing upright on flat, level ground. The angle θ is approximately 30°, which satisfies two requirements of operability and the degree of protrusion in the width direction of the lever box.

The axis XL of the parking brake lever 63 is oriented so as to be directed toward a master cylinder 401. The master cylinder 401 is mounted to the right side handlebar, adjacent an outer end thereof. Accordingly, it is possible to set the parking brake lever at a suitable angle, in such a manner that the operator can smoothly and easily grasp the parking brake lever after releasing the handlebar.

Figure 8:
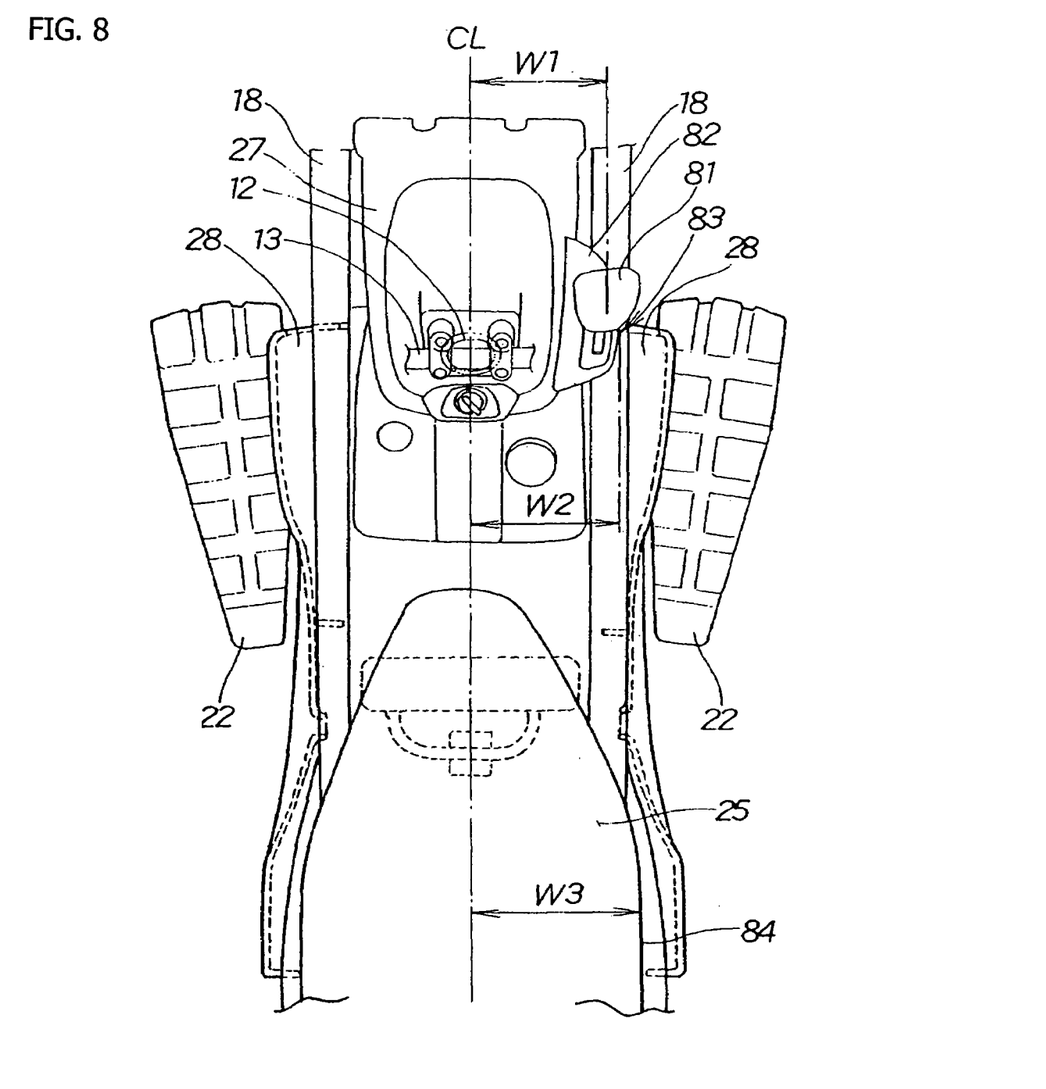
FIG. 8 is a top plan view of a front portion of the scooter-type vehicle according to the illustrative embodiment of the present invention, showing the parking brake lever positioned to be laterally outward from the centerline of the head pipe by an amount W1, and showing the seat half-width W2.

FIG. 8 is a top plan view showing a front portion of the scooter-type vehicle according to the illustrative embodiment of the present invention. FIG. 8 shows that the grip handle 81 of the parking brake lever 63 is situated proximate the head pipe 12. Specifically, the grip handle 81 is located at a position a distance WI laterally outward from, and to the right side of the head pipe 12. Referring back to FIG. 6, similarly, a top end portion 12T of the head pipe 12 is substantially on the same level as the grip handle 81. Therefore, the grip handle 81 of the parking brake lever 63 is disposed generally at the same height as the top end portion 12T of the head pipe 12. Because the parking brake lever 63 is disposed at a location near the head pipe 12, the parking brake lever 63 is situated near the handlebar 13 (see FIG. 8). The operator therefore needs to move his or her hand only a short distance from the handlebar 13 to grasp the parking brake lever 63. Operability of the parking brake lever is therefore significantly enhanced by this ergonimic design.

Still referring to FIG. 8, a lever box 82 is formed to be more narrow when viewed from above, than the width of the seat on which the operator sits, or 2×W3. Specifically, a length W2 from the vehicle centerline CL to an outer surface 83 of the lever box 82 is formed so as to be shorter than a length W3 from the vehicle centerline CL to an outer surface 84 of the operator's seat 25, that is, W2<W3. This minimizes the space required by the lever box 82 in the width direction.

Figure 9:
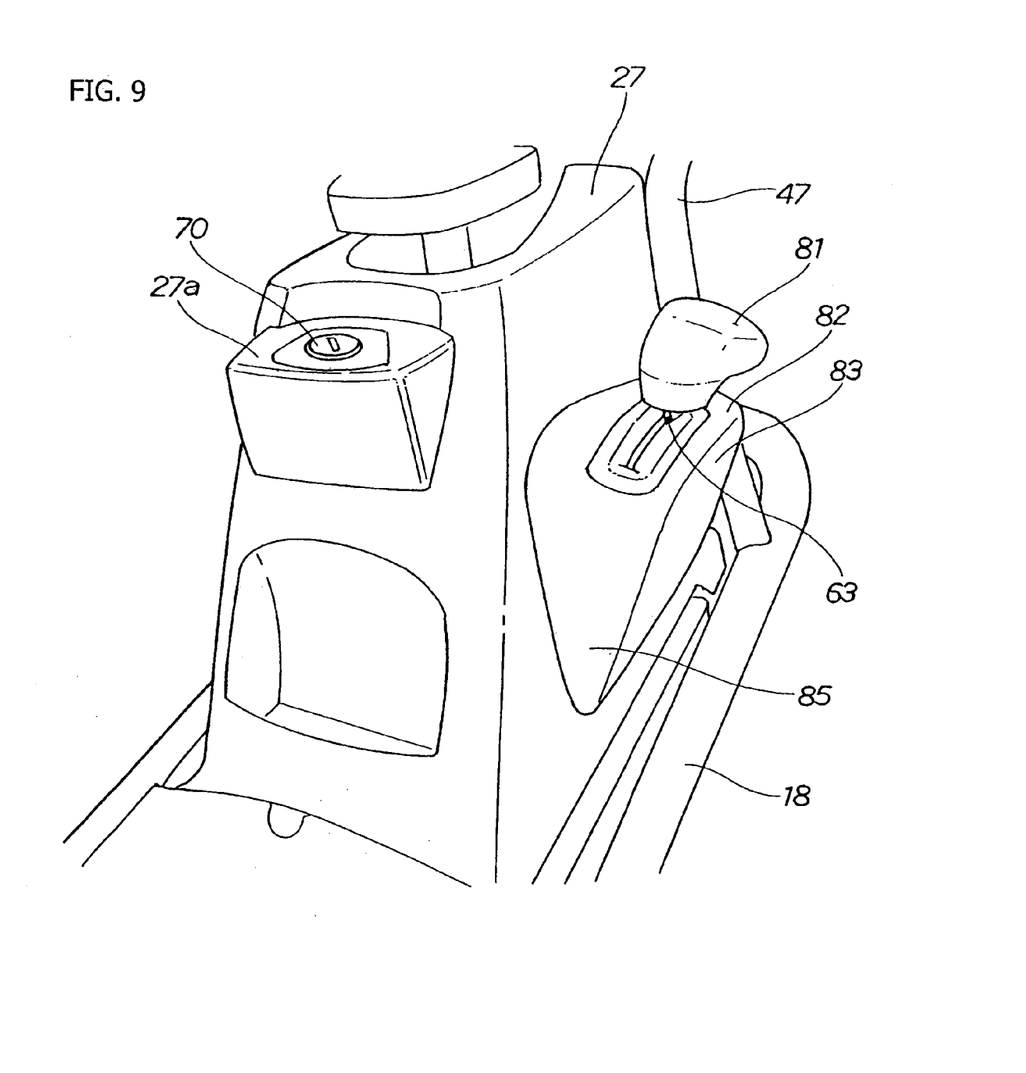
FIG. 9 is a rear perspective view of the front portion of the scooter-type vehicle according to the illustrative embodiment of the present invention, showing the lever box formed on a lateral outwardly-facing side of the handlebar post cover.

FIG. 9 is a rear perspective view showing part of the front portion of the scooter-type vehicle according to the illustrative embodiment of the present invention. The head pipe 12 is covered with the handlebar post cover 27. The lever box 82 is provided on a side surface of the handlebar post cover 27. An upper end portion of the parking brake lever 63 protrudes upward from the lever box 82, and the grip handle 81 is secured to the upper end portion of the parking brake lever 63.

As noted, the upper end portion of the parking brake lever 63 protrudes upwardly from the lever box 82 provided on the side surface of the handlebar post cover 27. In addition, the grip handle 81 is mounted on the upper end portion of the parking brake lever 63. This allows the operator to quickly take hold of the parking brake lever 63.

The lever box 82 is formed substantially in a wedge shape, as shown, so that it is narrower on a lower side 85 than an upper side thereof, when viewed from the front. This allows the lever box 82 to be built compactly, and results in less space being required for the lever box 82 around the handlebar post cover 27.

Referring once again to FIG. 7, the lateral outer surface 83 of the lever box 82 is formed to be substantially parallel to the axis XL of the parking brake lever 63. Thus, the space required for the lever box 82 around the handlebar post cover 27 can be made even more compactly.

The present invention has many positive benefits. Referring again to FIG. 7, the parking brake lever 63 is offset from the vehicle centerline CL, as noted, and oriented to be movable in the fore-aft direction (in the direction towards the front and back side of the vehicle) when operated. Further, the axis XL of the parking brake lever 63 is inclined at an angle of θ relative to the vertical line OL perpendicular to the ground surface. This significantly enhances the operating feel of the parking brake lever 63.

Figure 10A:
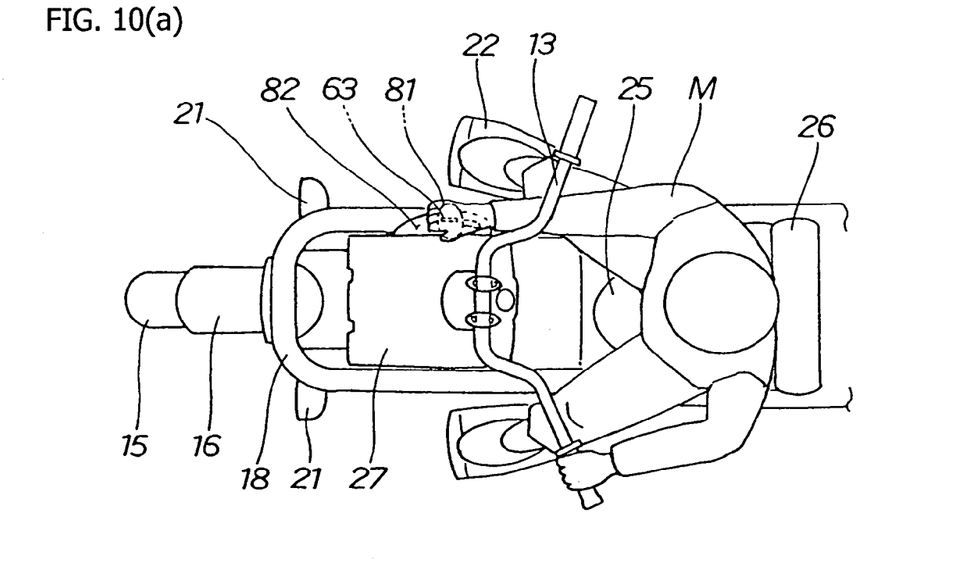
Figure 10B:
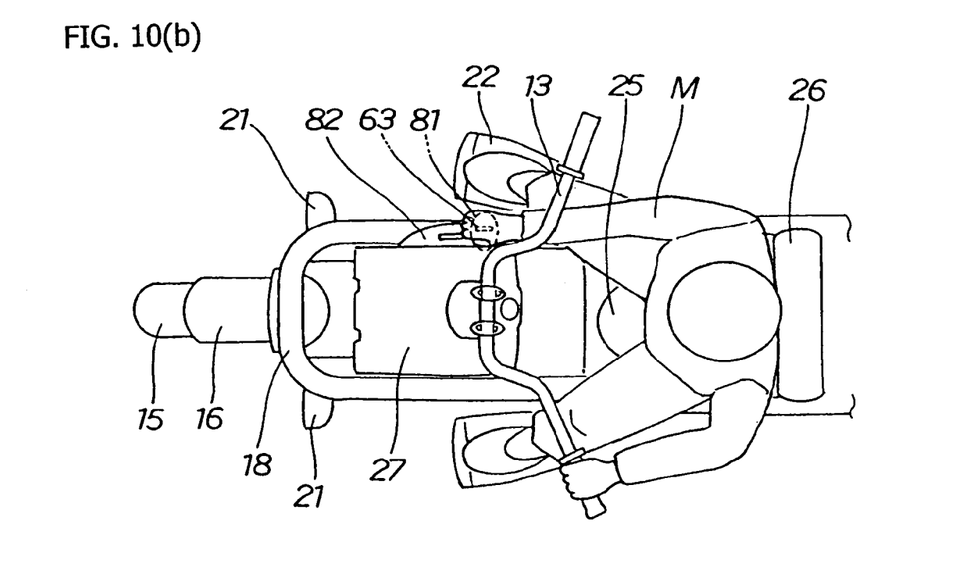

FIGS. 10(a) and 10(b) are explanatory views showing the operation of the parking brake lever 63. Referring to FIG. 10(a), a operator M stops the vehicle, moves his or her hand from the handlebar 13 to the grip handle 81 of the parking brake lever 63, and takes hold of the grip handle 81. In the position shown in FIG. 10(a), the parking brake lever 63 is in an OFF position. Referring now to FIG. 10(b), the operator M, who has taken hold of the grip handle 81 of the parking brake lever 63, pulls the grip handle 81 of the parking brake lever 63 rearwardly, thereby placing the parking brake lever 63 in an ON position and activating the parking brake. This completes the parking brake activation operation.

Operating feel and operability of the parking brake lever 63 can be significantly enhanced, and the parking brake lever 63 can be built even more compactly by appropriately setting the position, direction, angle, and the like of the parking brake lever 63 as described above.

The attachment structure for the vehicle parking brake lever in accordance with the present invention is suitably applicable to a two-wheeled vehicle. The attachment structure can nonetheless be applied to a three-wheeled vehicle and even to a general vehicle.

Although the present invention has been described herein with respect to an illustrative embodiment, the foregoing description is intended to be illustrative, and not restrictive. Those skilled in the art will realize that many modifications of the embodiment could be made which would be operable. All such modifications which are within the scope of the claims are intended to be within the scope and spirit of the present invention.

I claim:

1. In a vehicle,
    the vehicle comprising:
        a frame,
        a parking brake for temporarily fixing the position of a wheel, and
        a parking brake lever for actuating the parking brake,
    the improvement comprising an attachment structure for attaching the parking brake lever to the frame,
    said attachment structure constructed and arranged in a manner such that the parking brake lever
    comprises a grip end and a cable connecting end, wherein the grip end is positioned higher than the cable connecting end,
    is offset from a centerline of the vehicle, is operatively attached to the frame so as to be pivotally movable toward the fore and aft of the vehicle when operated, and has an axis that is inclined at an acute angle relative to a vertical plane which laterally bisects the vehicle, so that when viewed from the rear of the vehicle, the grip end of the parking brake lever is spaced a greater distance from the plane than the cable connecting end of the parking brake lever, wherein the frame comprises a head pipe, and wherein the attachment structure is configured to locate the parking brake lever proximate the head pipe.

2. The parking brake attachment structure of claim 1, wherein the head pipe is covered with a front cover, wherein the attachment structure comprises a lever box which is operatively attached to a side surface of said front cover, and wherein said grip end of said parking brake lever protrudes upwardly from the lever box.

3. The parking brake attachment structure of claim 2, wherein the vehicle comprises a seat for supporting an operator thereon, and wherein the lever box is narrower than half of the width of the seat when viewed from above the vehicle.

4. The parking brake attachment structure of claim 2, wherein the lever box is narrower at a lower end than at an upper end thereof when viewed from the front of the vehicle.

5. The parking brake attachment structure of claim 2, wherein an outer surface of said lever box is substantially parallel to an axis of said parking brake lever.

6. The parking brake attachment structure of claim 2, wherein the axis of said parking brake lever is oriented to be directed toward a master cylinder.

7. A vehicle comprising
a parking brake mechanism,
a parking brake lever, the parking brake lever comprising an upper end and a lower end, wherein the upper end is positioned higher than the lower end, the upper end comprising a hand grip,
a cable operably connected between the parking brake mechanism and the lower end of the parking brake lever, and
a vehicle frame, wherein
the parking brake lever is spaced away from a centerline of the vehicle, and has a central axis which is oriented at an acute angle relative to the vertical when viewed from the rear of the vehicle, and
wherein the vehicle comprises a head pipe, and wherein said parking brake lever is situated proximate the head pipe.

8. The vehicle of claim 7, further comprising a lever box operatively connected to the vehicle frame, for housing the parking brake lever.

9. The vehicle of claim 7, further comprising a lever pin, wherein the parking brake lever is pivotally attached to the vehicle frame by the lever pin so as to be movable in the forward and rearward directions of the vehicle within a plane of motion, and
wherein the plane of motion of the parking brake lever is oriented at an angle relative to the vertical.

10. The vehicle of claim 7, further comprising a lever pin and a lever support bracket, and wherein the parking brake lever is pivotally attached to the lever support bracket by the lever pin, the bracket configured to laterally offset the parking brake lever at a distance from the centerline of the vehicle.

11. The vehicle of claim 10, wherein the vehicle comprises a seat, and wherein the parking brake is offset from the center line of the vehicle by a distance which is less than the width of the seat.

12. The vehicle of claim 11, wherein the vehicle is a motorcycle, and wherein the parking brake is offset from the center line of the vehicle by a distance which is is less than half the width of the seat.

13. The vehicle of claim 8, wherein the the parking brake lever protrudes outwardly from an upper portion of the lever box, and wherein the lever box comprises a lateral side surface which is parallel to the plane of motion of the parking brake lever.

14. The vehicle of claim 8, wherein the parking brake lever protrudes outwardly from an upper surface of the lever box,
wherein the lever box comprises a lateral side surface positioned a distance W2 from the vehicle centerline,
wherein the vehicle comprises a seat having lateral side edges positioned a distance W3 from the vehicle centerline,
and wherein W2<W3.

15. The vehicle of claim 8, wherein the parking brake lever protrudes outwardly from an upper surface of the lever box, and wherein the lever box is narrower at a lower end than at an upper end thereof when viewed from the front of the vehicle.

16. The vehicle of claim 8, wherein the vehicle comprises a head pipe, and wherein an upper end of the parking brake lever is situated at approximately the same height as the upper end of the head pipe.

17. The vehicle of claim 8, wherein the vehicle comprises a master cylinder and a handlebar, wherein the master cylinder is mounted adjacent a lateral outer end of the handlebar, wherein the parking brake lever has a longitudinal axis, and wherein longitudinal axis of the parking brake lever is directed toward the master cylinder.

18. In a vehicle,
the vehicle comprising:
frame,
a parking brake for temporarily fixing the position of a wheel, and
a parking brake lever for actuating the parking brake,
the improvement comprising an attachment structure for attaching the parking brake lever to the frame,
said attachment structure constructed and arranged in a manner such that the parking brake lever
comprises a grip end and a cable connecting end, wherein the grip end is positioned higher than the cable connecting end,
is offset from a centerline of the vehicle,
is operatively attached to the frame so as to be pivotally movable toward the fore and aft of the vehicle when operated, and
has an axis that is inclined at an acute angle relative to a vertical plane which laterally bisects the vehicle, so that when viewed from the rear of the vehicle, the grip end of the parking brake lever is spaced a greater distance from the plane than the cable connecting end of the parking brake lever, and
wherein
the frame comprises a head pipe,
the attachment structure is configured to locate the parking brake lever proximate the head pipe,
the head pipe is covered with a front cover,
the attachment structure comprises a lever box which is operatively attached to a side surface of said front cover, and
the grip end of said parking brake lever protrudes upwardly from the lever box such that a handle disposed on the grip end resides adjacent to a lateral side of the head pipe.

* * * * *